United States Patent [19]

Daly et al.

[11] Patent Number: 5,079,621

[45] Date of Patent: Jan. 7, 1992

[54] DCT TRANSFORM COMPRESSION, TRANSMISSION AND RECOVERY OF DIGITAL COLOR USING VIRTUAL FILTERING MECHANISM

[75] Inventors: Scott J. Daly, Scottsville; Edward M. Granger, Rochester, both of N.Y.

[73] Assignee: Eastman Kodak Company, Rochester, N.Y.

[21] Appl. No.: 546,593

[22] Filed: Jun. 29, 1990

[51] Int. Cl.[5] .................. H04N 7/133; H04N 11/02; H04N 11/04

[52] U.S. Cl. ............................. 358/13; 358/85; 358/133; 358/138

[58] Field of Search ................. 358/13, 133, 138, 85

[56] References Cited

U.S. PATENT DOCUMENTS

| | | | |
|---|---|---|---|
| 4,375,650 | 3/1983 | Tiemann | 358/133 |
| 4,774,574 | 9/1988 | Daly | 358/133 |
| 4,780,761 | 10/1988 | Daly | 358/133 |

OTHER PUBLICATIONS

"Equivalent-Noise Model for Contrast Detection and Discrimination", by A. J. Ahumada, Jr., et al., vol. 2, No. 7, Jul. 1985, J. Opt. Soc. Am. A, pp. 1133-1139.

"The Contrast Sensitivity of Human Colour Vision to Red-Green and Blue-Yellow Chromatic Gratings" by K. T. Mullen, J. Physiol, (1985), vol. 359, pp. 381-400.

"Disappearance of Stabilized Chromatic Gratings", by D. H. Kelly, Science, vol. 214, pp. 1257-1258, (1981).

"Chromatic Spatial Sine-Wave Responses of the Human Visual System", by A. Watanabe et al., NHK Laboratories Note, Ser. No. 198, Mar. 1976, pp. 1-10.

"Visual Chromaticity-Modulation Transfer Function", by E. M. Granger et al., Journal of the Optical Society of America, vol. 63, No. 9, Sep. 1973, pp. 1173-1174.

Primary Examiner—Howard W. Britton
Attorney, Agent, or Firm—Edward Dugas

[57] ABSTRACT

A color imagery compression/decompression mechanism employs a contrast sensitivity function model of the human visual system for color images, to derive normalization values for compressing chromatic components of the color imagery data. The CSF model is defined in terms of an ADT color space transform (15), the chromatic channels of which conform with the band-limited sensitivity of the visual system. The transform for obtaining the ADT components is executable by reduced complexity logic operators. Each of the ADT components is block transform coded using DCT transform coefficients (18) that are normalized (24) in accordance with a 'weighted' (46, 45) CSF model (42) of the human visual system, which effectively performs a low pass filtering of the chromatic (DT) channels. This low pass filter-weighting of the normalization values in the compression, transmit end (10) of the system produces a set of normalized coefficients which effectively blur the image and reduce the entropy in the chromatic channels and may be implemented using a Gaussian function. In the decompression process at the receiver (14), a corresponding set of denormalization coefficients (32), which are generated in accordance with the same chromatic CSF model of the human visual system, are not weighted, so that the cascading of the normalization and denormalizing operators in the transmitter and receiver yields a product less than unity, simulating the entropy-reducing effect of subsampling.

64 Claims, 5 Drawing Sheets

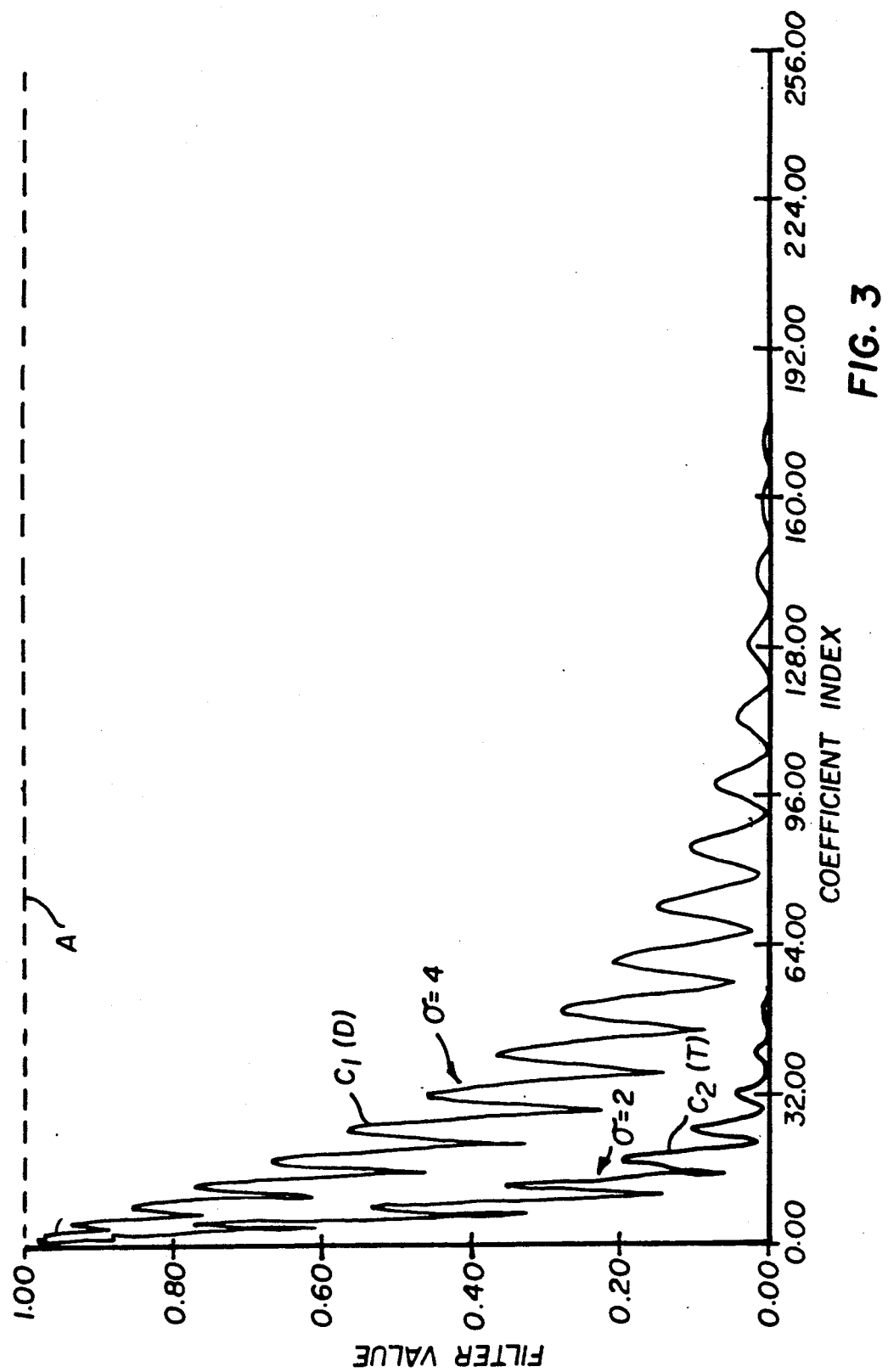

DCT TRANSFORM COMPRESSION, TRANSMISSION AND RECOVERY OF DIGITAL COLOR USING VIRTUAL FILTERING MECHANISM

FIELD OF THE INVENTION

The present invention relates in general to the transmission and recovery of digitally formatted color image representative signals and is particularly directed to a modified color transform, virtual filtering mechanism that achieves narrow bandwidth compression without subsampling.

BACKGROUND OF THE INVENTION

Due to its wide distribution and ready access, the telephone link has become a major communication medium for a variety of telecommunication and information processing applications. Because a conventional copper link has a very limited bandwidth (typically on the order of 3.3 KHz), it is usually necessary to compress the data prior to transmission. Consequently, considerable time and effort have been spent in both communications and signal processing technologies to produce compression mechanisms that operate so as to optimize the quality of the recovered signal at the receive end of the channel.

One compression mechanism that has proven particularly useful for digital image signal processing is adaptive block transform compression, as described in the U.S. Pat. Nos. 4,774,574 (hereinafter denoted '574) and 4,780,761 (hereinafter denoted '761) to Daly et al, each assigned to the assignee of the present application and the disclosures of which are incorporated herein. In accordance with these patented schemes, (DCT) transform coefficients are normalized in accordance with a model of the human visual system. Since the human system model reveals aspects of decreased visual sensitivity, then by normalizing the transform coefficients so that the contribution of such aspects is substantially reduced, a further enhancement in the compression ratio can be realized. Although the patents describe the application of the adaptive transform compression mechanism to monochromatic images, they indicate that it may also be applied to the luminance component of color images. However, the chrominance components are still processed with constant normalization, since the resulting processing gain does not justify the added complexity.

Because color imagery data contains additional components and is inherently more complex than monochromatic data, it is customarily subsampled (filtered and decimated) in order to reduce the bandwidth prior to compression. For conventional color imagery data processing, low pass filtering and subsampling is carried out globally, namely over the entire image. However, global filtering is not possible in the above-referenced patented systems, since data is processed in block format. Consequently, filtering and subsampling of the block-formatted data would require an extended addressing scheme, placing a substantial memory burden on the signal processor and reducing signal processing speed.

SUMMARY OF THE INVENTION

In accordance with the present invention, the benefits of using a model of the human visual system to normalize the transform coefficients of the DCT operator for a monochromatic image are extended to a color image signal processing, without having to actually perform filtering and subsampling, so that the above mentioned hardware penalty is not imposed on the signal processor. In particular, the present invention is directed to a mechanism which employs a contrast sensitivity function (CSF) model of the human visual system for color images, to derive normalization values to be used in the compression of chromatic components, as well as the achromatic component, of the color imagery data. The CSF model is defined in terms of a color space transform, the chromatic channels of which have a bandwidth that is considerably less than that of the RGB signal components, so that the transformed signals conform with the band-limited sensitivity of the visual system. In particular, the color transform is defined by a transform coordinate system containing achromatic (A), deuteranopic (D) and tritanopic (T) axes. Advantageously, the coefficients of the transform for obtaining the ADT components from the RGB signals employs a set of conversion coefficients, absolute values of which are related to one another in powers of two, so that the original RGB signals can be transformed into the ADT color space by reduced complexity logic operators (shift and add).

Each of the color-converted A, D and T components is block transform coded using DCT transform coefficients that are normalized in accordance with a 'weighted' CSF model of the human visual system, which effectively performs a low pass filtering of the chromatic channels (the D and T components) of the input color imagery data. This low pass filter-weighting of the normalization values in the compression/transmit end of the system produces a set of normalized coefficients which effectively blur the chromatic components of the image and reduce the entropy in the chromatic channels. The low-pass weighting of the CSF coefficients in the chromatic channels may be implemented using a Gaussian function. In the decompression process at the receiver, a corresponding set of denormalization coefficients, which are generated in accordance with the same chromatic CSF model of the human visual system, are not weighted, so that the cascading of the normalization and denormalizing operators in the transmitter and receiver yields a product less than unity, simulating the entropy-reducing effect of filtering and subsampling process normally carried out in other similar systems. In other words the low-pass weighting of the bandwidth limited chromatic channels of the CSF model for generating the normalization array in the transmitter's compression mechanism effectively operates as a 'virtual filter' that blurs the image, so that the effect of subsampling is accomplished, without actually having to perform the subsampling.

BRIEF DESCRIPTION OF THE DRAWINGS

FIG. 3 shows CI(D) and C2(T) non-unity filter arrays in a zig-zag format that may be employed by a DCT operator;

DETAILED DESCRIPTION

Figure 1:
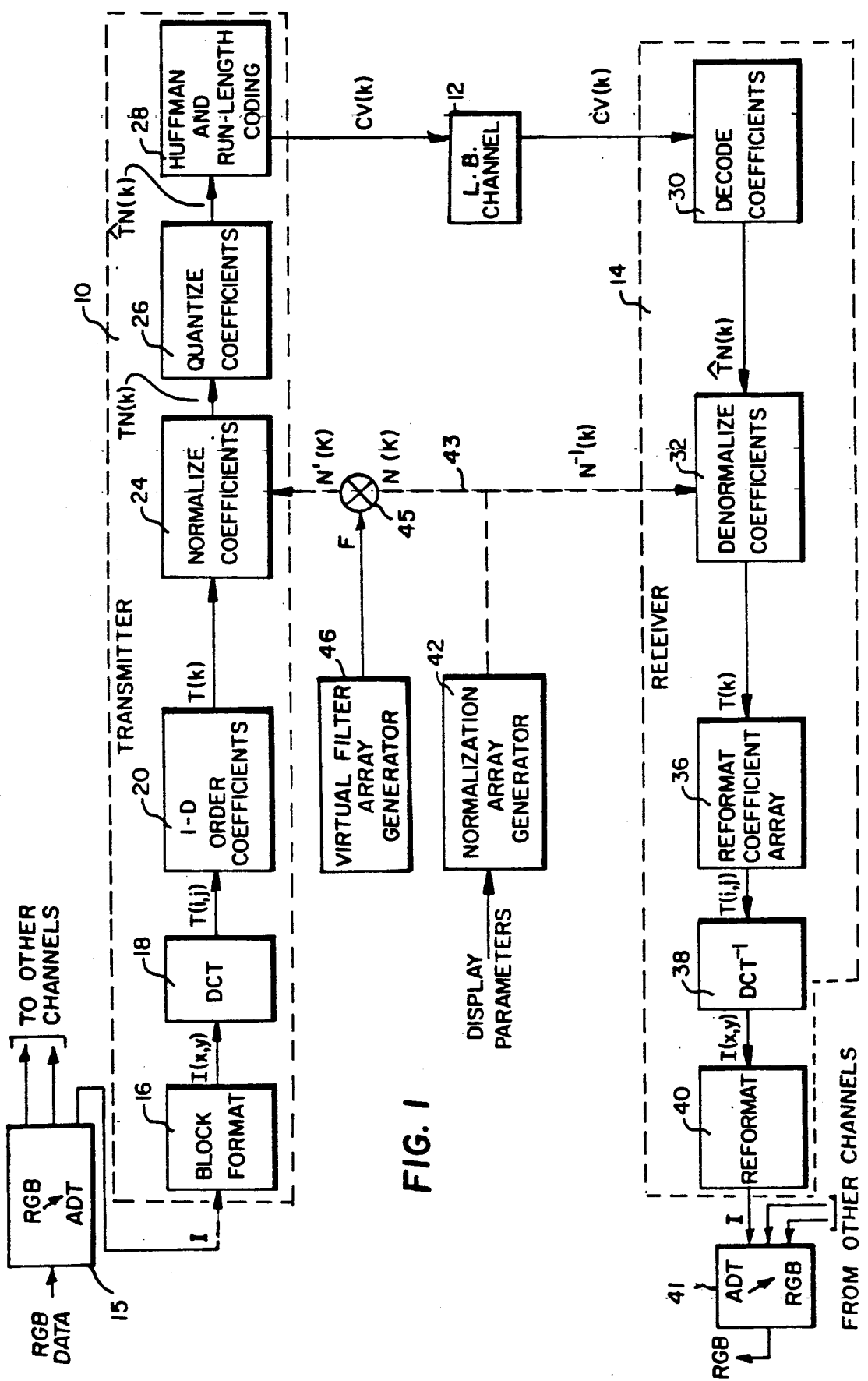
FIG. 1 is a flow diagram showing a system for compressing and transmitting digitally formatted color image representative signals in accordance with an embodiment of the present invention.

Before describing in detail the particular improved color imagery compression and transmission system in accordance with the present invention, it should be observed that the present invention resides primarily in a novel structural combination of conventional signal processing and communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the figures do not necessarily represent the mechanical structural arrangement of the exemplary system, but are primarily intended to illustrate the major structural components of the system in a convenient functional grouping, whereby the present invention may be more readily understood.

As pointed out above, the present invention is directed to a mechanism for modifying the above referenced '761 and '574 patented schemes, which successfully compresses, transmits and recovers color image-representative digital data without subsampling. Except for the color conversion mechanism and its complement, which are respectively carried out at upstream and downstream ends of the system, and the incorporation of the virtual low-pass filtering mechanism as part of the transform coefficient normalization process, the signal processing mechanism of the present invention for an individual channel is identical to that illustrated in FIG. 1 of the '761 patent. Since the color imagery data upon which the invention operates contains multiple channel components, the signal processing mechanism of FIG. 1, which represents a single channel, is replicated for each channel. Consequently, in the description to follow, only those portions of FIG. 1 relating to the color space conversion and virtual filter operators will be described in detail. For a description of the remainder of the system, attention may be directed to the '761 patent. In addition, it is to be observed that the above-referenced telephone channel is cited merely for purposes of illustrating one non-limitative example of a narrow bandwidth communication channel with which the present invention may be employed.

As noted above, the chromatic CSF model employed for generating the normalization and denormalization arrays in accordance with the present invention is defined in terms of a color space transform, the chromatic channels of which have a bandwidth that is considerably less than that of the RGB signal components, so that the transformed signals conform with the band-limited sensitivity of the visual system. In particular, the color transform is defined by a coordinate system containing approximating achromatic (A), deuteranopic (D) and tritanopic (T) axes. In addition, the coefficients of the transform for obtaining the ADT components from the RGB signals employs a set of conversion coefficients, absolute values of which are related to one another in powers of two, so that the original RGB signals can be transformed into the ADT color space by reduced complexity logic operators (shift and add).

For this purpose, at the upstream end of transmitter 10, color imagery data (e.g. RGB data from a color image sensor) is coupled to a color transform operator 15, a respective transform output channel of which is coupled to block formatting unit 16. Color transform operator 15 preferably comprises combinational logic that performs a color space conversion of RGB data into an 'approximately opposing colors' space comprised of an achromatic component (A) and a pair of chromatic components (C1) and (C2).

In its most general form, the color conversion operation performed by color transform operator 15 may be defined by means of a matrix of color space conversion coefficients in which each of the chrominance coefficients C1 and C2 has a range similar to that of the achromatic coefficient A as:

$$\begin{bmatrix} A \\ C1 \\ C2 \end{bmatrix} = \begin{bmatrix} \tfrac{1}{2} & \tfrac{1}{2} & 0 \\ \tfrac{1}{2} & -\tfrac{1}{2} & 0 \\ \tfrac{1}{4} & \tfrac{1}{4} & -\tfrac{1}{2} \end{bmatrix} \begin{bmatrix} R \\ G \\ B \end{bmatrix}, \quad (1)$$

which can be readily executed in combinational logic using nine shifts and four add operations.

The inverse of transform (1) is:

$$\begin{bmatrix} R \\ G \\ B \end{bmatrix} = \begin{bmatrix} 1 & 1 & 0 \\ 1 & -1 & 0 \\ 1 & 0 & -2 \end{bmatrix} \begin{bmatrix} A \\ C1 \\ C2 \end{bmatrix}, \quad (2)$$

which requires only one shift and three add operations.

Although the relative ranges of chromatic coefficients C1 and C2 are the same as achromatic value A, their polarities are both positive and negative, while the polarity of A is non-negative. In order for C1 and C2 to have the same absolute range as A, an offset corresponding to the range of A divided by two is added to each chromatic coefficient. This offset (Amax−Amin)/2 is actually equal to Amax/2, since Amin is zero for nearly all implementations. The resulting set of color space transform equations are:

$$A = \tfrac{1}{2}R + \tfrac{1}{2}G$$

$$C1 = \tfrac{1}{2}R - \tfrac{1}{2}G + Amax/2$$

$$C2 = \tfrac{1}{4}R + \tfrac{1}{4}G - \tfrac{1}{2}B + Amax/2. \quad (3)$$

To implement equation set (3), the logic circuitry within color transform operator 15 requires nine shift and six add operations.

The inverse of equation set (3) is:

$$R = A + (C1 - \tfrac{1}{2}Amax)$$

$$G = A - (C1 - \tfrac{1}{2}Amax)$$

$$B = A - (2(C2 - \tfrac{1}{2}Amax))$$

which is executed by an inverse color transform operator 41, coupled to the A, D and T output channels of reformat unit 40 within receiver 14. Like color transform operator 15 at the transmit end of the system, inverse color transform operator 41 preferably contains relative simple logic circuitry for implementing equation set (4), specifically a single shift and six add operations. In each of equation sets (3) and (4) the value ½ as a multiplier for Amax is precalculated. In addition, the maximum value of each of Amax, Rmax, Gmax and Bmax is the same.

Each of the achromatic (A) and two chromatic (C1 and C2) components produced by color transform operator 15 is coupled over one of the A, D and T channels to a dedicated block formatter 16, the output of which is coupled to a DCT operator 18, so that, for the three (ADT) channels, respective blocks of converted color space transform coefficients $T_A(i,j)$, $T_D(i,j)$ and $T_T(i,j)$ are generated. These ADT-DCT coefficients are arranged by respective linear array operators 20 into one dimensional arrays $T_A(k)$, $T_D(k)$ and $T_T(k)$. in order of increasing spatial frequency. Each of the respective one-dimensional arrays of ordered coefficients is normalized (24) prior to quantization (26), encoding and transmission (28).

As pointed out briefly above, like the normalization mechanism employed in the '761 patent, the present invention employs a model of the human visual system to normalize each array of transform coefficients. However, unlike the patented scheme, the signal processing mechanism of the present invention normalizes the DCT coefficients in accordance with a 'weighted' CSF model of the human visual system, which effectively performs a low pass filtering of the chromatic channels (the D and T components) of the input color imagery data. This low pass filterweighting of the normalization values produced by normalization array generator 42 yields an array of normalized DCT coefficients which effectively blur the image and reduce the entropy in the chromatic channels. Namely, the low-pass weighting of the bandwidth limited chromatic channels of the CSF model for generating the normalization array in the transmitter's compression mechanism effectively operates as a 'virtual filter' that blurs the image, so that the effect of subsampling is accomplished, without actually having to perform the subsampling.

The model of the human visual system upon which the normalization array (42) is based is the contrast sensitivity function (CSF) of the human visual system, employed for luminance channel processing by the mechanism described in the '761 patent and extended for application to chrominance channels in the present invention. For purposes of the present description, the achromatic (A) channel corresponds to modulations from black to white or yellow, the C1 (or D) channel corresponds to red-green components and the C2 (or T) channel corresponds to blue-yellow modulations.

Figure 2A:
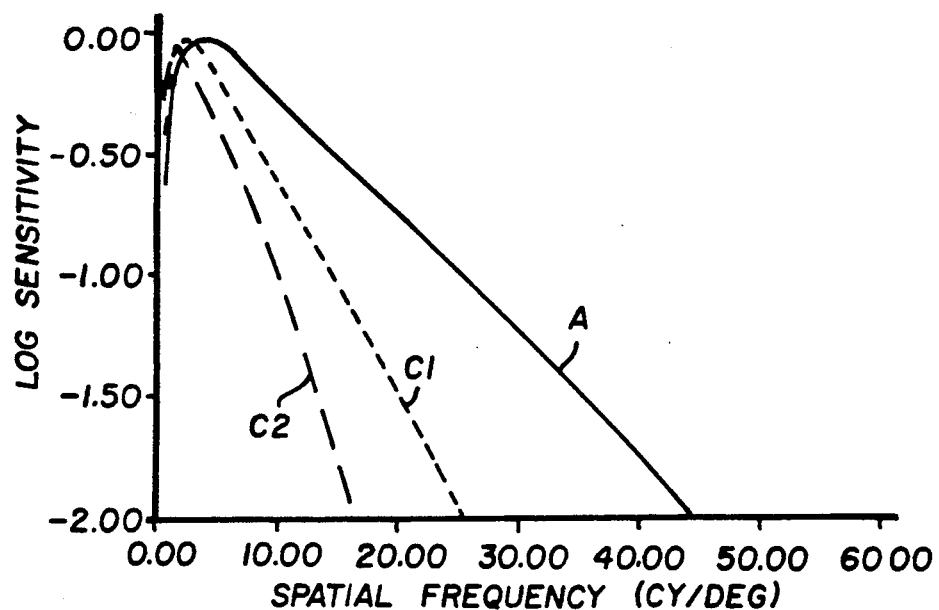
FIGS. 2A and 2B show a (log) sensitivity vs. spatial frequency diagram of the A, C1, C2 chromatic model for respective upper and lower frequency bands of the CSF model.
Figure 2B:
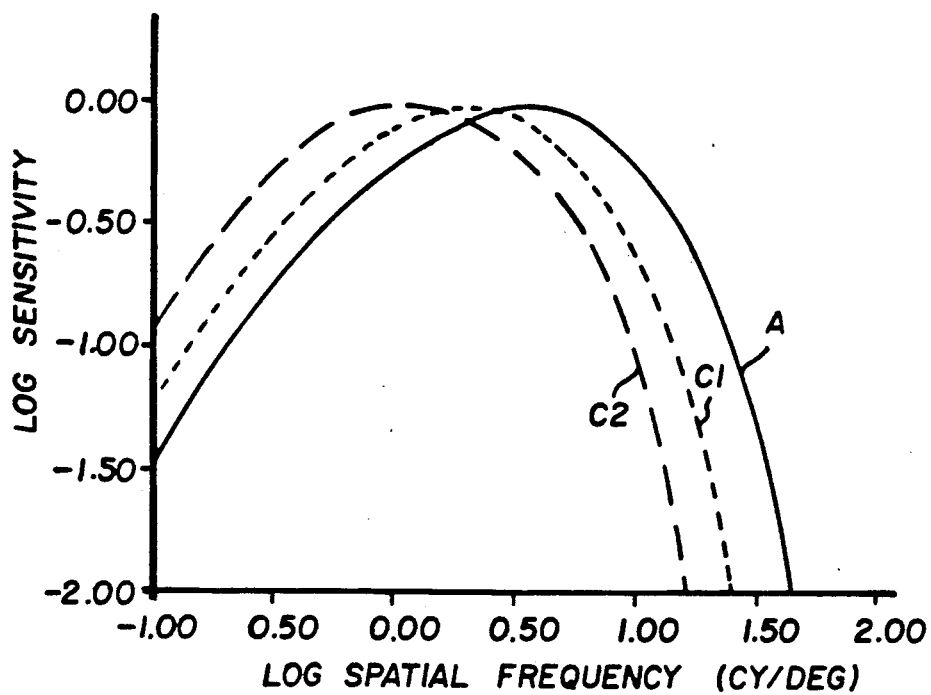

As shown in FIG. 2, which is a (log) sensitivity vs. spatial frequency diagram of the A, C1, C2 chromatic model for respective upper and lower frequency bands of the CSF model, a significant aspect of the chromatic channels (C1, C2) is their substantial reduction in bandwidth (which facilitates image compression) compared to the luminance or achromatic channel (A). The use of this model enables the CSF to be tailored to display conditions in an exact manner, which is important in view of the highly adaptive nature of human vision. Although such a chromatic model is preferably employed for each of the A, C1 and C2 channels, if a simpler method is desired, the model described in the '761 patent can be used, with the viewing distance for the C1 channel set to twice that of the A channel, and that of the C2 channel set to four times that of the A channel.

In order to implement the above described 'low pass virtual filtering' function that effectively simulates subsampling, the respective normalization arrays $N_A(k)$, $N_D(k)$ and $N_T(k)$ for the A, C1 and C2 channels produced by the respective normalization array generators 42 are coupled over associated links 43 to be multiplied (45) by respective arrays of filter weights generated by respective virtual filter array generators 46. These arrays of filter weights serve as 'entropy reducers'. They are not 'filters' in the sense that they are applied in the DCT domain and, as a result, their properties are slightly different from their Fourier transform equivalent. However, these differences are not significant since the processing mechanism is reasonably robust with respect to filter type; a principal requirement is that the filter weights be low-pass.

For this purpose, each A, D and T filter array (defined for the block size of the DCT) is preferably a two-dimensional isotropic Gaussian low-pass filter centered at the DC (frequency 0,0) coefficient, and is of the form $F(i,j)=(e^{-r^2/2\sigma^2})$, where $r=(i^2+j^2)^{\frac{1}{2}}$. The A channel filter is unity for all DCT coefficients, so that $\sigma=10,000$. For the D channel $\sigma=4$. For the T channel, $\sigma=2$. Each filter function has a value of 1.0 at DC and falls to a value of zero. However, it is the inverse of the filter, $1/F(i,j)$, which multiplies the normalization array.

Figure 4:
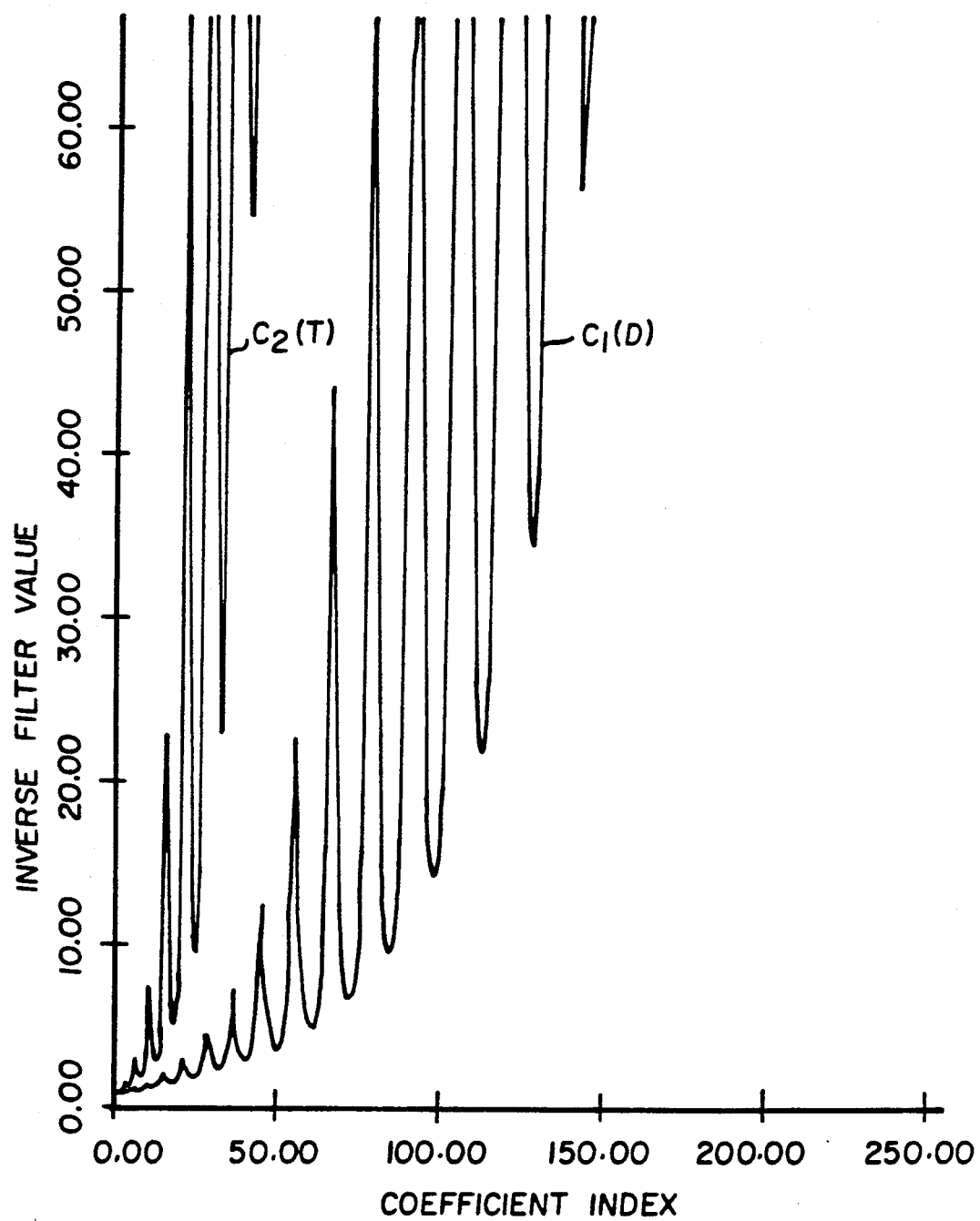
FIG. 4 shows inverse plots of the C1(D) and C2(T) non-unity filter arrays of FIG. 3.

FIG. 3 shows C1(D) and C2(T) non-unity filter arrays in a zig-zag format that may be employed by DCT operator 18. (It should be noted that zig-zag format is only one of many possible ways to convert from a two-dimensional array to a one-dimensional array, and the invention is not limited to the use of only this conversion scheme.) Each array is plotted over an eight bit (0–255) coefficient index range, from an upper value of one to a lower value of zero. This range results from the example of using a (16×16=256) block. The scalloped shapes result from the zigzag scan across the two-dimensional (radially isotropic) Gaussian function. The broken line at unity represents the (unused) 'filter' for the A channel. FIG. 4 shows inverse plots of the C1(D) and C2(T) non-unity filter arrays of FIG. 3. The upper extreme values are clipped for purposes of simplifying their graphic illustration. From a practical standpoint, values in excess of 20 are not very meaningful and values higher than 128 will result in any DCT coefficient being quantized to zero (for an eight-bit input image).

Mapping of the CSF model to the normalization array will be described using the following definitions:

S = Sensitivity (The inverse of the contrast at threshold.) Its units are 1/contrast (which, in reality, is unitless).

Dc = Contrast per code value of the display, which is, in general, a function of the code value (cv), i.e. Dc(cv). Its units are contrast/cv.

Q = maximum quantization error in normalized coefficient space. Its units are in cv's.

Cq = Gain for the compression mechanism and represents the peak-peak spatial function value in code values for a coefficient magnitude of 1.0. Its units are code value/coefficient value.

In the absence of the virtual filtering array, the normalization value N is defined in accordance with these parameters by the expression:

$$N = 1/S * Dc * Cq * Q$$
$$= 1/((1/\text{contrast}) * (\text{contrast/code value}) * (\text{code value/coefficient}) * (\text{coefficient})),$$

which is unitless.

From the above expression for N, it can be seen that as either the sensitivity and/or contrast per code values increase, the normalization value decreases which, in turn, increases the bit rate. Sensitivity S varies with frequency, noise level and light level, while contrast per code value varies with grey level and display. Displays are often quantized equidensity and, for small signals, the contrast $Cn = 1.149 \Delta D$. In practice, it is preferred to set the variation of Dc to a constant near the mean of the display's dynamic range.

In accordance with the incorporation of the virtual filter array (F) of the present invention, the normalization expression for the encoder becomes:

$$N_T = 1/(S*Dc*Cq*Q*F).$$

Since the purpose of the filtering function is to blur the image, no complement is employed in the receiver. Thus, within the receiver decoder, the denormalization expression is:

$$D_R = 1/(S*Dc*Cq*Q*).$$

It will be noted that $N_T$, $D_R$, S and F are functions of the DCT coefficient index i,j for the two-dimensional block, or a function of coefficient index k for the linearly ordered array.

The chromatic CSFs for the C1 and C2 channels may be considered to be unitless and contrast is not necessarily explicitly definable for isoluminant signals (i.e. C1 and C2). As a result, the contrast/code value has no specific meaning or units. In practice, normalization arrays having a minimum value of 1.0 have been employed. Namely, the peak sensitivity Sp and Dc form a product of $(2)^{\frac{1}{2}}$. Since $Cq = (2)^{\frac{1}{2}}$ and $Q = \frac{1}{2}$, the normalized value N is;

$$1/(2)^{\frac{1}{2}*}(2)^{\frac{1}{2}*}(\tfrac{1}{2})=1.$$

Figure 5:
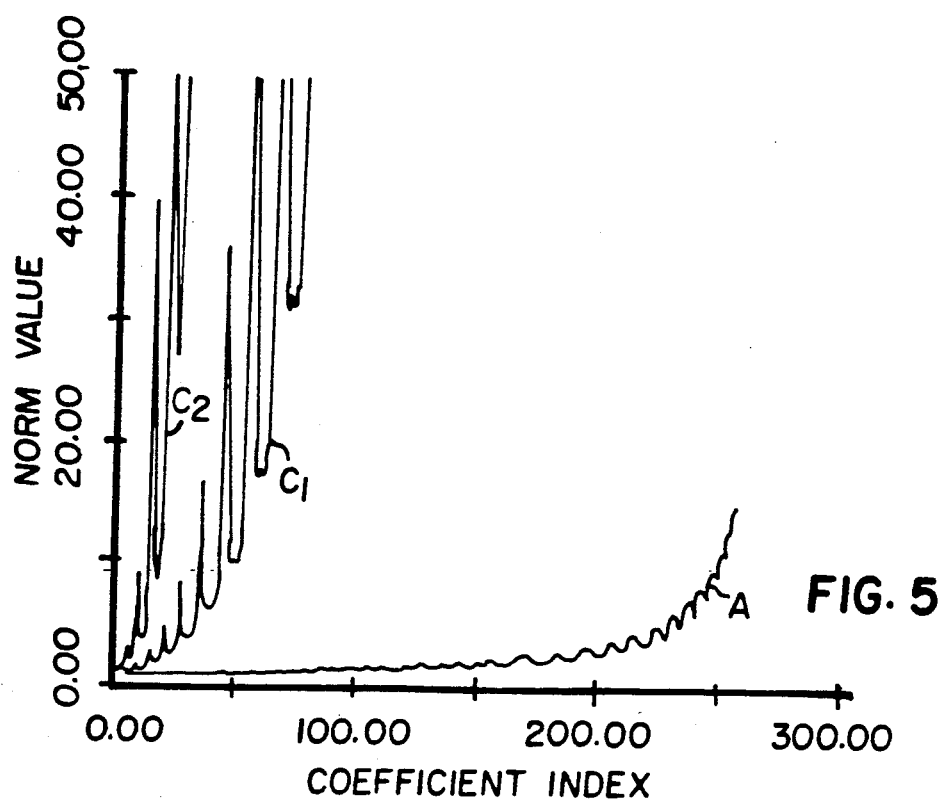
FIGS. 5 and 6 illustrate chromatic normalization and denormalization array values for ADT color space plotted for transmitter and receiver sections, respectively of the system of FIG. 1.
Figure 6:
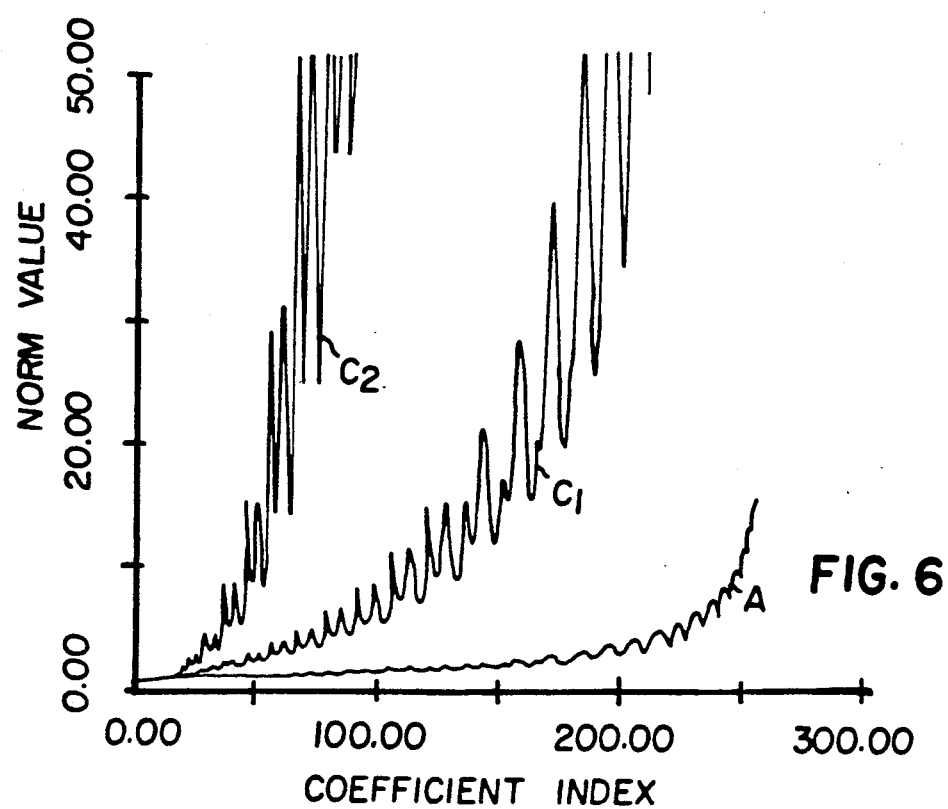

In FIGS. 5 and 6 chromatic normalization (including the effect of the virtual filter) and denormalization array values for ADT color space are plotted for the transmitter and receiver sections 10 and 14, respectively, for blocks of $16 \times 16$ or 256 coefficients. The plotted characteristics show both the CSFs and the modified (virtual filter) values, based upon the following parameters: viewing distance = 4H for a $512 \times 512$ pixel array (each pixel corresponds to 0.025 degrees); image size = 20 degrees; block size = $16 \times 16$; Sp = 320, noise = 0; and light adaptation level = 200 cd/m². In both the transmitter and the receiver, the normalization (denormalization) array for the achromatic component A is the same. However, as described previously, in the transmitter, the chromatic channels have a pronounced low-pass characteristic, so as to simulate subsampling. Because the normalization values become quite large, only those chromatic channels having a value of 50 or less are shown. As noted above, most coefficients will be set to zero for the higher normalization values.

In the foregoing discussion, the exemplary system to which the present invention has been applied has been that described in the '761 patent. When incorporating the present invention in the masking system described in the '574 patent, the feedback loop of the encoder section of the transmitter, which simulates the denormalization of the decoder in the receiver, is affected by the quantization process. In the '574 system, the decoder array is employed as the global normalization array that appears in the feedback loop of the encoder. In the decoder of the '574 system there is only one global normalization array which should be employed as the decoder array.

Comparisons of the color transform, virtual filtering mechanism of the present invention with conventional RGB (not color-transformed), with and without subsampling have revealed that the present invention provides a marked improvement in performance. When contrasted with a scheme in which no subsampling or color transformation is employed, the present invention provides a significant bit rate reduction (on the order of 60%). When contrasted with a scheme in which there is no subsampling, but color transformation alone is employed, the present invention provides a reduction in bit rate on the order of 25%. Even when contrasted with the case in which color transformation and subsampling are employed, the present invention has only a slight increase in bit rate (on the order of 6%); however, as noted above, the hardware and signal processing speed penalties required to subsample block-formatted data are avoided.

As will be appreciated from the foregoing description, the present invention successfully extends the benefits of using a low pass 'weighted' chromatic CSF model of the human visual system to normalize the transform coefficients of the DCT operator to color image signal processing, without having to actually perform subsampling, so that a hardware penalty is not imposed on the signal processor. Since the CSF model is defined in terms of a color space transform, the chromatic channels of which have a bandwidth that is considerably less than that of the RGB signal components, the transformed signals conform with the band-limited sensitivity of the visual system. In addition the transform conversion coefficients are related to one another in powers of two, so that RGB signals can be transformed into ADT color space by reduced complexity logic operators.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed is:

1. A method of compressing digitally formatted data values representative of the contents of a color image comprising the steps of;
    (a) generating first imagery data representative of a chromatic component of said color image and second imagery data representative of a nonchromatic component of said color image; and
    (b) performing block transform coding of said first and second imagery data using human visual system normalization.

2. A method according to claim 1, wherein step (b) includes performing block transform coding of said second imagery data using chromatic channel normalization values generated in accordance with chromatic components of a color contrast sensitivity function model of the human visual system, said chromatic channel normalization values being weighted to effect a low pass filtering thereof.

3. A method according to claim 1, wherein said digitally formatted data values representative of said color image are comprised of a first plurality of data values each of which is associated with a respectively different color component of said color image and step (a) comprises converting said first plurality of data values to a second plurality of data values respectively representative of an achromatic component of said color image and first and second chrominance components of said color image.

4. A method according to claim 3, wherein said first and second chrominance components are respectively associated with deuteranopic and tritanopic components of said color image.

5. A method according to claim 3, wherein step (a) comprises converting said first plurality of data values to a second plurality of data values respectively representative of said achromatic component of said color image and said first and second chrominance components of said color image by means of transform relationship numerical components of which are related to one another in powers of a base integer.

6. A method according to claim 5, wherein said base integer is two.

7. A method according to claim 1, wherein step (b) includes performing block transform coding of said first and second imagery data using normalization values generated in accordance with a color contrast sensitivity function model of the human visual system.

8. A method according to claim 7, wherein step (b) includes performing block transform coding of said first and second imagery data using normalization values generated in accordance with a color contrast sensitivity function model of the human visual system and weighted to emphasize a prescribed spectral aspect of said normalization values.

9. A method according to claim 7, wherein step (b) comprises performing a spatial frequency transformation of a two-dimensional block of said first and second imagery data to produce respective sets of transform coefficients which are normalized in accordance with said color contrast sensitivity function model of the human visual system.

10. A method according to claim 9, wherein said spatial frequency transformation performs a discrete cosine transformation.

11. A method according to claim 9, wherein step (b) further includes quantizing the normalized transform coefficients.

12. A method of transmitting digitally formatted data values representative of the contents of a color image from a transmitter site over a bandwidth limited channel to a receiver site and recovering said digitally formatted data values so as to enable said color image to be reconstructed at said receive site comprising the steps of:

at said transmitter site,
(a) generating first imagery data representative of a chromatic component of said color image and second imagery data representative of a nonchromatic component of said color image;

(b) performing block transform coding of said first and second imagery data using human visual system normalization; and (c) transmitting the imagery data coded in step (b) over said limited bandwidth communication channel to said receiver site; and at said receiver site,
(d) receiving the coded imagery data transmitted in step (c) over said limited bandwidth communication channel from said transmitter site;

(e) performing block transform decoding of the coded data received in step (d) to derive said first and second imagery data; and (f) transforming the first and second imagery data derived in step (e) into said digitally formatted data values representative of the contents of said color image.

13. A method according to claim 12, wherein said digitally formatted data values representative of said color image are comprised of a first plurality of data values each of which is associated with a respectively different color component of said color image, step (a) comprises converting said first plurality of data values to a second plurality of data values respectively representative of an achromatic component of said color image and first and second chrominance components of said color image, and step (f) comprises transforming said second plurality of data values to said first plurality of data values.

14. A method according to claim 13, wherein said first and second chrominance components are respectively associated with deuteranopic and tritanopic components of said color image.

15. A method according to claim 14, wherein step (a) comprises converting said first plurality of data values to a second plurality of data values respectively representative of said achromatic component of said color image and said first and second chrominance components of said color image by means of transform relationship numerical components of which are related to one another in powers of a base integer, and wherein step (f) comprises transforming said second plurality of data values to said first plurality of data values by means of transform relationship numerical components of which are related to one another in powers of said base integer.

16. A method according to claim 15, wherein said base integer is two.

17. A method according to claim 12, wherein step (b) includes performing block transform coding of said first and second imagery data using normalization values generated in accordance with a color contrast sensitivity function model of the human visual system, and wherein step (e) includes performing block transform decoding of the coded data received in step (d) using denormalization values generated in accordance with said color contrast sensitivity function model of the human visual system.

18. A method according to claim 17, wherein step (b) includes performing block transform coding of said first and second imagery data using normalization values generated in accordance with a color contrast sensitivity function model of the human visual system and weighted to emphasize a prescribed spectral aspect of said normalization values, and step (e) includes performing block transform decoding of the data received in step (d) using denormalization values generated in accordance with said color contrast sensitivity function model of the human visual system.

19. A method according to claim 17, wherein step (b) comprises performing a spatial frequency transformation of a two-dimensional block of said first and second imagery data to produce respective sets of transform coefficients which are normalized in accordance with said color contrast sensitivity function model of the human visual system, and wherein step (e) comprises performing an inverse spatial frequency transformation of said respective sets of transform coefficients which have been denormalized in accordance with said color contrast sensitivity function model of the human visual system.

20. A method according to claim 19, wherein said spatial frequency transformation performs a discrete cosine transformation.

21. For use with a color imagery data communication system in which digitally formatted data values representative of the contents of a color image are compressed by generating first imagery data representative of a chromatic component of said color image and second imagery data representative of a non-chromatic component of said color image and performing block transform coding of said first and second imagery data using human visual system normalization, and then transmitted from a transmitter site over a limited bandwidth communication channel to a receiver site, a method of recovering said digitally formatted data values so as to enable said color image to be reconstructed at said receive site comprising the steps of:
  (a) receiving the coded imagery data transmitted over said limited bandwidth communication channel from said transmitter site;
  (b) performing block transform decoding of the coded data received in step (a) to derive said first and second imagery data; and
  (c) transforming the first and second imagery data derived in step (b) into said digitally formatted data values representative of the contents of said color image.

22. A method according to claim 21, wherein said digitally formatted data values representative of said color image are comprised of a first plurality of data values each of which is associated with a respectively different color component of said color image, said first plurality of data values having been converted into said second plurality of data values respectively representative of an achromatic component of said color image and first and second chrominance components of said color image, and wherein step (c) comprises transforming said second plurality of data values to said first plurality of data values 23. A method according to claim 22, wherein said first and second chrominance components are respectively associated with deuteranopic and tritanopic components of said color image.

24. A method according to claim 23, wherein said first plurality of data values have been converted into said second plurality of data values respectively representative of said achromatic component of said color image and said first and second chrominance components of said color image by means of transform relationship numerical components of which are related to one another in powers of a base integer, and wherein step (c) comprises transforming said second plurality of data values to said first plurality of data values by means of transform relationship numerical components of which are related to one another in powers of said base integer.

25. A method according to claim 24, wherein said base integer is two.

26. A method according to claim 21, wherein said first and second imagery data have been block transform coded using normalization values generated in accordance with a color contrast sensitivity function model of the human visual system, and wherein step (b) includes performing block transform decoding of received coded data received using denormalization values generated in accordance with said color contrast sensitivity function model of the human visual system.

27. A method according to claim 26, wherein said first and second imagery data have been block transform coded using normalization values generated in accordance with said color contrast sensitivity function model of the human visual system and weighted to emphasize a prescribed spectral aspect of said normalization values, and step (b) includes performing block transform decoding of the received data using denormalization values generated in accordance with said color contrast sensitivity function model of the human visual system.

28. A method according to claim 27, wherein said first and second imagery data have been subjected to a spatial frequency transformation in a two-dimensional block format to produce respective sets of transform coefficients which are normalized in accordance with said color contrast sensitivity function model of the human visual system, and wherein step (b) comprises performing an inverse spatial frequency transformation of said respective sets of transform coefficients which have been denormalized in accordance with said color contrast sensitivity function model of the human visual system.

29. A method according to claim 28, wherein said spatial frequency transformation performs a discrete cosine transformation.

30. A method of compressing digitally formatted color imagery data representative of the contents of a color image, said data containing a first plurality of data values each of which is associated with a respectively different color component of said color image comprising the steps of:
  (a) transforming said first plurality of data values into a second plurality of data values respectively representative of an achromatic component of said color image and first and second chrominance components of said color image, data values of said second plurality that are representative of said first and second chrominance components having a bandwidth less than that of said first plurality of data values; and
  (b) performing block transform coding of said first and second imagery data using human visual system normalization, normalization values for which are defined in accordance with a virtual filtering operator which effectively reduces the entropy in said color imagery data.

31. A method according to claim 30, wherein said first and second chrominance components are respectively associated with deuteranopic and tritanopic components of said color image.

32. A method according to claim 30, wherein step (a) comprises transforming said first plurality of data values to a second plurality of data values respectively representative of said achromatic component of said color image and said first and second chrominance components of said color image by means of a set of conversion coefficients absolute values of which are related to one another in powers of two.

33. An apparatus for compressing digitally formatted data values representative of the contents of a color image comprising:

first means for generating first imagery data representative of a chromatic component of said color image and second imagery data representative of a non-chromatic component of said color image; and second means for performing block transform coding of said first and second imagery data using human visual system normalization.

34. An apparatus according to claim 33, wherein said second means comprises means for block transform coding said second imagery data using chromatic channel normalization values generated in accordance with chromatic components of a color contrast sensitivity function model of the human visual system, said chromatic channel normalization values being weighted to effect a low pass filtering thereof.

35. An apparatus according to claim 33, wherein said digitally formatted data values representative of said color image are comprised of a first plurality of data values each of which is associated with a respectively different color component of said color image and wherein said first means comprises means for converting said first plurality of data values to a second plurality of data values respectively representative of an achromatic component of said color image and first and second chrominance components of said color image.

36. An apparatus according to claim 35, wherein said first and second chrominance components are respectively associated with deuteranopic and tritanopic components of said color image.

37. An apparatus according to claim 33, wherein said first means comprises means for converting said first plurality of data values to a second plurality of data values respectively representative of said achromatic component of said color image and said first and second chrominance components of said color image by a transform relationship numerical components of which are related to one another in powers of a base integer.

38. An apparatus according to claim 37, wherein said base integer is two.

39. An apparatus according to claim 33, wherein said second means includes means for performing block transform coding of said first and second imagery data using normalization values generated in accordance with a color contrast sensitivity function model of the human visual system.

40. An apparatus according to claim 39, wherein said second means includes means for block transform coding said first and second imagery data using normalization values generated in accordance with a color contrast sensitivity function model of the human visual system and weighted to emphasize a prescribed spectral aspect of said normalization values.

41. An apparatus according to claim 39, wherein said second means comprises means for performing a spatial frequency transformation of a two-dimensional block of said first and second imagery data to produce respective sets of transform coefficients which are normalized in accordance with said color contrast sensitivity function model of the human visual system.

42. An apparatus according to claim 41, wherein said spatial frequency transformation performs a discrete cosine transformation.

43. An apparatus according to claim 41, wherein said second means further includes means for quantizing the normalized transform coefficients.

44. A system for compressing digitally formatted data values representative of the contents of a color image and transmitting the compressed data from a transmitter site over a bandwidth limited channel to a receiver site and recovering said digitally formatted data values so as to enable said color image to be reconstructed at said receive site comprising:

at said transmitter site;

first means for transforming said digitally formatted data values into first imagery data representative of a chromatic component of said color image and second imagery data representative of a non-chromatic component of said color image;

second means for block transform coding said first and second imagery data using human visual system normalization; and third means for transmitting the imagery data coded by said second means over said limited bandwidth communication channel to said receiver site; and at said receiver site;

fourth means for receiving the coded imagery data transmitted over said limited bandwidth communication channel from said transmitter site;

fifth means for block transform decoding the received coded data to derive said first and second imagery data; and sixth means for transforming the first and second imagery data derived by said fifth means into said digitally formatted data values representative of the contents of said color image.

45. A system according to claim 44, wherein said digitally formatted data values representative of said color image are comprised of a first plurality of data values each of which is associated with a respectively different color component of said color image, said first means includes means for converting said first plurality of data values to a second plurality of data values respectively representative of an achromatic component of said color image and first and second chrominance components of said color image, and said sixth means includes means for transforming said second plurality of data values to said first plurality of data values.

46. A system according to claim 45, wherein said first and second chrominance components are respectively associated with deuteranopic and tritanopic components of said color image.

47. A system according to claim 46, wherein said first means includes means for converting said first plurality of data values to a second plurality of data values respectively representative of said achromatic component of said color image and said first and second chrominance components of said color image by means of transform relationship numerical components of which are related to one another in powers of a base integer, and wherein sixth means for transforming said second plurality of data values to said first plurality of data values by means of transform relationship numerical components of which are related to one another in powers of said base integer.

48. A system according to claim 47, wherein said base integer is two.

49. A system according to claim 44, wherein said second means includes means for block transform coding said first and second imagery data using normalization values generated in accordance with a color contrast sensitivity function model of the human visual system, and wherein said fifth means includes means for block transform decoding of the received coded data using denormalization values generated in accordance with said color contrast sensitivity function model of the human visual system.

50. A system according to claim 49, wherein said second means includes means for block transform coding said first and second imagery data using normalization values generated in accordance with a color contrast sensitivity function model of the human visual system and weighted to emphasize a prescribed spectral aspect of said normalization values, and said fifth means includes means for block transform decoding the received data using denormalization values generated in accordance with said color contrast sensitivity function model of the human visual system.

51. A system according to claim 49, wherein said second means include means for performing a spatial frequency transformation of a two-dimensional block of said first and second imagery data to produce respective sets of transform coefficients which are normalized in accordance with said color contrast sensitivity function model of the human visual system, and wherein said fifth means includes means for performing an inverse spatial frequency transformation of said respective sets of transform coefficients which have been denormalized in accordance with said color contrast sensitivity function model of the human visual system.

52. A system according to claim 51, wherein said spatial frequency transformation comprises a discrete cosine transformation.

53. For use with a color imagery data communication system in which digitally formatted data values representative of the contents of a color image are compressed by the generation of first imagery data representative of a chromatic component of said color image and second imagery data representative of a nonchromatic component of said color image and performing block transform coding of said first and second imagery data using human visual system normalization, and then transmitted from a transmitter site over a limited bandwidth communication channel to a receiver site, an apparatus for recovering said digitally formatted data values so as to enable said color image to be reconstructed at said receive site comprising:
 first means for receiving the coded imagery data that has been transmitted over said limited bandwidth communication channel from said transmitter site;
 second means for performing block transform decoding the received coded data to derive said first and second imagery data; and
 third means for transforming the first and second imagery data derived by said second means into digitally formatted data values representative of the contents of said color image.

54. An apparatus according to claim 53, wherein said digitally formatted data values representative of said color image are comprised of a first plurality of data values each of which is associated with a respectively different color component of said color image, said first plurality of data values having been converted into said second plurality of data values respectively representative of an achromatic component of said color image and first and second chrominance components of said color image, and wherein said third means comprises means for transforming said second plurality of data values to said first plurality of data values.

55. An apparatus according to claim 54, wherein said first and second chrominance components are respectively associated with deuteranopic and tritanopic components of said color image.

56. An apparatus according to claim 55, wherein said first plurality of data values have been converted into said second plurality of data values respectively representative of said achromatic component of said color image and said first and second chrominance components of said color image by means of transform relationship numerical components of which are related to one another in powers of a base integer, and wherein said third means comprises means for transforming said second plurality of data values into said first plurality of data values by means of transform relationship numerical components of which are related to one another in powers of said base integer.

57. An apparatus according to claim 56, wherein said base integer is two.

58. An apparatus according to claim 53, wherein said first and second imagery data have been block transform coded using normalization values generated in accordance with a color contrast sensitivity function model of the human visual system, and wherein said second means includes means for block transform decoding received coded data received using denormalization values generated in accordance with said color contrast sensitivity function model of the human visual system.

59. An apparatus according to claim 58, wherein said first and second imagery data have been block transform coded using normalization values generated in accordance with said color contrast sensitivity function model of the human visual system and weighted to emphasize a prescribed spectral aspect of said normalization values, and said second means includes means for block transform decoding the received data using denormalization values generated in accordance with said color contrast sensitivity function model of the human visual system.

60. An apparatus according to claim 59, wherein said first and second imagery data have been subjected to a spatial frequency transformation in a two-dimensional block format to produce respective sets of transform coefficients which are normalized in accordance with said color contrast sensitivity function model of the human visual system, and wherein said second means includes means for performing an inverse spatial frequency transformation of said respective sets of transform coefficients which have been denormalized in accordance with said color contrast sensitivity function model of the human visual system.

61. An apparatus according to claim 60, wherein said spatial frequency transformation performs a discrete cosine transformation.

62. An apparatus for compressing digitally formatted color imagery data representative of the contents of a color image, said data containing a first plurality of data values each of which is associated with a respectively different color component of said color image comprising:
 first means for transforming said first plurality of data values into a second plurality of data values respectively representative of an achromatic component of said color image and first and second chrominance components of said color image, data values of said second plurality that are representative of said first and second chrominance components having a bandwidth less than that of said first plurality of data values; and second means for block transform coding said first and second imagery data using human visual system normalization, normalization values for which are defined in accordance with a virtual filtering operator which effectively reduces the entropy in said color imagery data.

63. An apparatus according to claim 62, wherein said first and second chrominance components are respectively associated with deuteranopic and tritanopic components of said color image.

64. An apparatus according to claim 62, wherein said first means includes means for transforming said first plurality of data values to a second plurality of data values respectively representative of said achromatic component of said color image and said first and second chrominance components of said color image by means of a set of conversion coefficients absolute values of which are related to one another in powers of two.

* * * * *